May 2, 1967
H. R. HENDERSON
3,317,779
ELECTRODE FEEDING SYSTEM FOR ELECTRIC ARC TORCHES
Filed Feb. 12, 1964
3 Sheets-Sheet 1
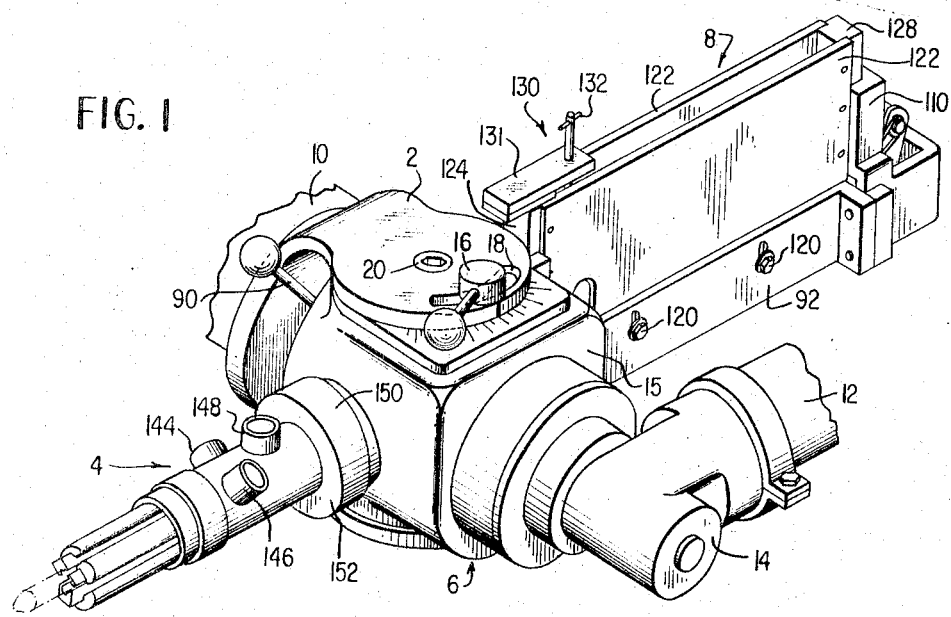
FIG. 1
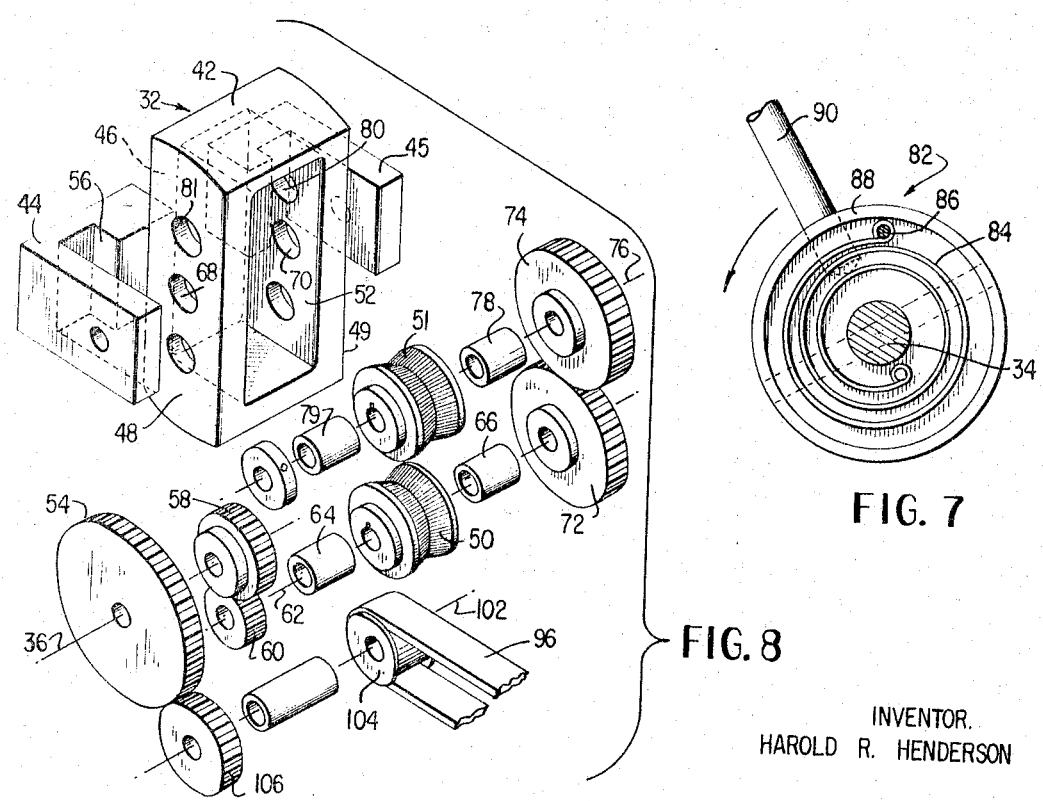
FIG. 7
FIG. 8
INVENTOR.
HAROLD R. HENDERSON
BY Browne, Schuyler &
Beveridge
ATTORNEYS.

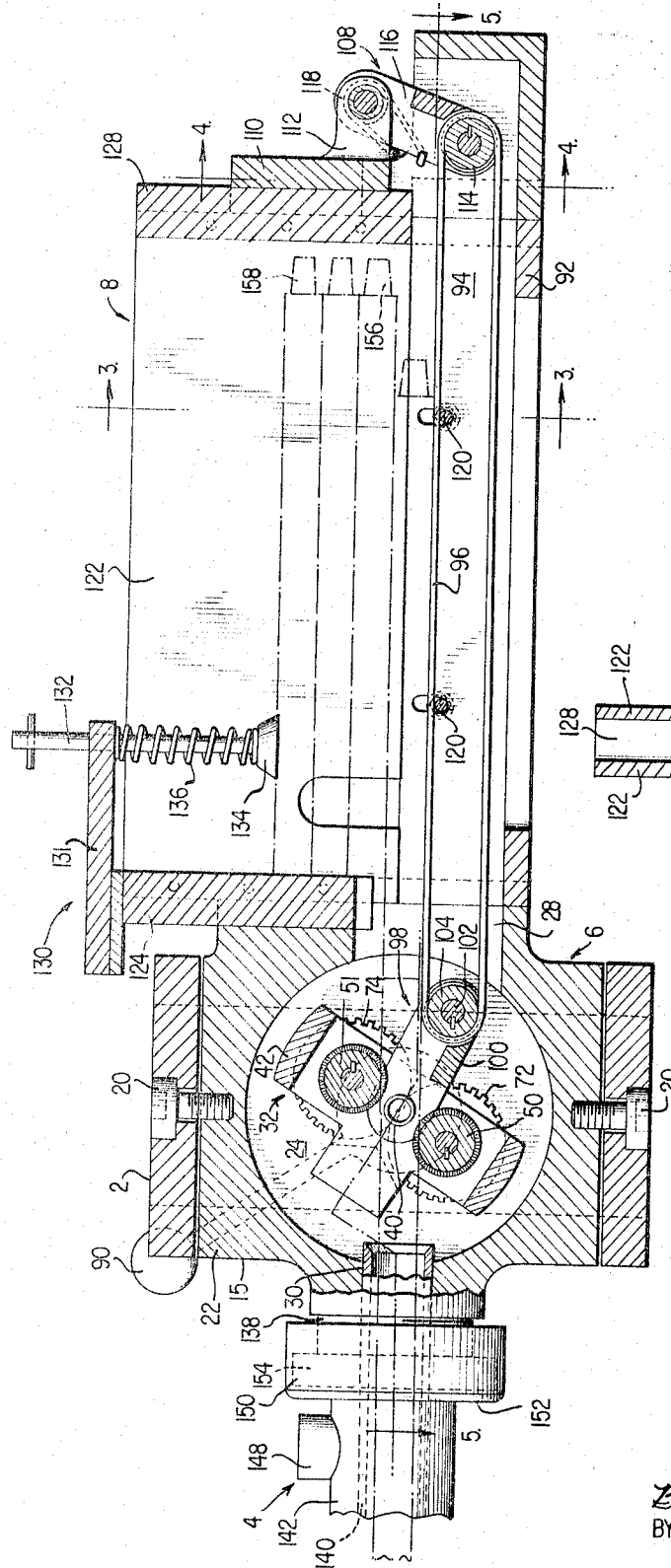
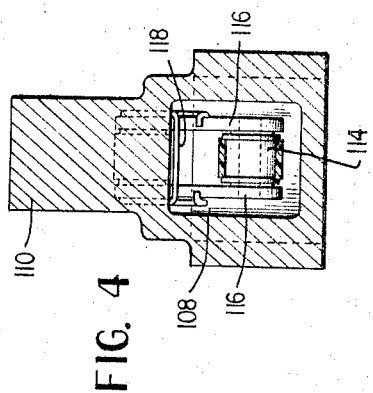
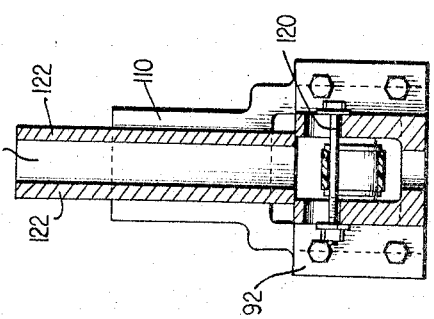
FIG. 2
FIG. 4
FIG. 3
INVENTOR.
HAROLD R. HENDERSON
BY Browne, Schuyler & Beveridge
ATTORNEYS

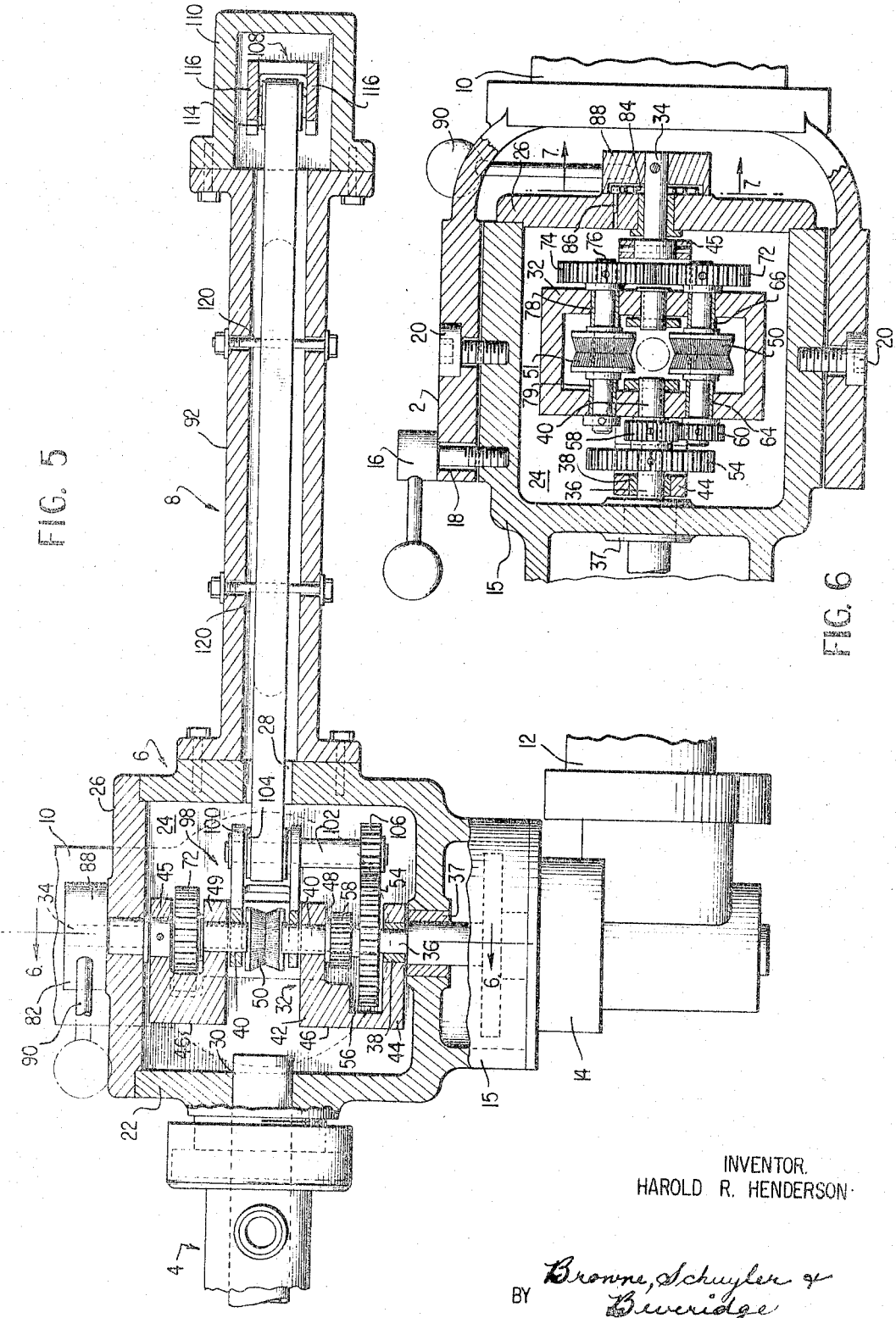

United States Patent Office 3,317,779
Patented May 2, 1967

3,317,779
ELECTRODE FEEDING SYSTEM FOR ELECTRIC ARC TORCHES
Harold R. Henderson, Lancaster, Ohio, assignor to Arcair Company, Bremerton, Wash., a partnership
Filed Feb. 12, 1964, Ser. No. 344,346
6 Claims. (Cl. 314—5)

This application relates to electric arc torches and more particularly to an electrode storage and feeding system for use with such torches.

In the metal working art many operations are performed by electric arc torches, such as cutting, gouging and welding. Each of these employs the heat generated by an arc struck with a consumable electrode for performing the desired operation. In most cases the arc is struck directly between the electrode and a workpiece, but in some others a third member may be used as the electrical return with the workpiece positioned in the path of the arc.

Regardless of the type of operation performed, and regardless of the path of the arc, in all of the methods the electrode is consumed, and where the arc is to be used extensively the problem arises of supplying the electrode material to maintain the arc for period of time. This involves problems of controlling the electrode feeding rate and providing sufficient electrode material to permit the torch to operate continuously over an extended period of time.

While several solutions to this problem have been proposed, none of them has been completely satisfactory. Most feeding mechanisms are designed for an electrode of particular sectional dimensions and are not adaptable to electrodes of various sizes or to electrodes which have dimensional variations. Where these variations occur, the feeding rate is affected and this affects the characterisics of the arc.

While some torches have facilities for storing a number of electrode sections, removal of these sections is done manually and results in wasted time. Where one electrode section is joined to the end of another section to ensure maximum utilization of the entire electrode, the problem also arises of effecting a firm and secure joint between the sections so that when the joint is consumed in the arc it will not disintegrate and spatter electrode material on the workpiece.

It is an object of this invention to provide an electric arc torch which stores a plurality of electrode sections and which automatically feeds these sections at a controllable rate to a torch nozzle where the arc is formed.

It is another object of this invention to provide an electric arc torch in which the succeeding electrode sections are automatically joined to form a single continuous electrode which is then fed to the torch nozzle.

It is another object of this invention to provide an electric arc torch which feeds the electrode to the nozzle at a controllable rate and which automatically adjusts to dimensional variations in the electrode section.

It is another object of this inventon to provide an electric arc torch in which additional electrode sections may be stored without interrupting the operation of the torch.

It is another object of this invention to provide an electric arc torch in which power and cooling fluid connections are made to a sleeve at the nozzle end, and the sleeve is rotatable to permit relative movement between the supply lines and the torch.

In accomplishing the aforementioned objects, a principal feature resides in the provision of an electric arc torch having attached thereto a storage hopper for a plurality of stacked electrode sections. Electrode sections are moved from the bottom of the hopper onto a driven conveyer belt carrying the sections toward a pair of feeding wheels which grip the sections and feed them to the torch nozzle. These feeding wheels are mounted on a rotatable support block which is spring biased to urge the wheels into firm engagement with the electrode section regardless of dimensional variations in the electrode. This firm engagement ensures that the feeding rate will be directly controlled by the feeding wheels. Both the wheels and the conveyer are driven by a common power source, but the gearing arrangement is such that the conveyor operates at a higher rate of linear speed. This ensures that succeding electrode sections will be driven together to form a firm joint. When the joint is formed, the conveyer slips under the section until the next section is to be conveyed. Stored sections are kept in the hopper and urged downwardly toward the conveyer by a spring actuater follower which may be disengaged and additional sections placed in the hopper while the torch is operating. The torch nozzle is attached to the storage and feeding mechanisms by a connector permitting axial rotation. Power, fluid and air connections are made at the nozzle end to permit maximum flexibility of the system.

FIG. 1 is a perspective view of the cutting torch assembly;

FIG. 2 is a sectional view of the cutting torch assembly;

FIG. 3 is a sectional view along the lines 3—3 of FIG. 2 showing the interior end portion of the hopper;

FIG. 4 is a sectional view along the lines 4—4 of FIG. 2 showing the rear mounting of the conveyer belt;

FIG. 5 is a top sectional view of the cutting torch assembly taken along the lines 5—5 of FIG. 2;

FIG. 6 is a sectional view taken along the lines 6—6 of FIG. 5 showing the electrode feeding mechanism;

FIG. 7 is a detail view showing the electrode feeder biasing spring taken along the lines 7—7 of FIG. 6; and FIG. 8 is an exploded view of the electrode feed mechanism.

The invention as disclosed is designed for use in a travelling head cutting torch system in which the torch is carriage mounted for movement on a track over the workpiece. However, since the mechanism for guiding and moving the torch in its cutting path forms no part of the present invention, only so much of that structure as is necessary to a full description of the torch assembly is illustrated. It should also be noted that the assembly as disclosed has application in other types of arc torches, and its use in a traveling head system is intended only to be illustrative.

As is shown in FIG. 1, the torch assembly is rotatably mounted between the jaws of a clevis 2 and comprises a nozzle assembly 4, a feeding mechanism 6, and an electrode section storage hopper 8. Clevis 2 is attached to arm 10 and may be rotated to position the torch assembly about an horizontal axis. Power for electrode feeding mechanism 6 is provided by a rotatably driven shaft 12 via a gear box 14 attached to the free side of a housing 15. A locking screw 16 extends through an arcuate slot 18 in the upper jaw of clevis 2 to permit rotatable positioning of the assembly about an axis defined by screws 20 which mount the assembly in clevis 2.

Housing 15 of feeding mechanism 6 is formed with a body 22 having a cylindrical recess 24 and an end cover plate 26. Storage hopper 8 is mounted on the rear of body 22 and an opening 28 permits passage of electrode sections into recess 24. A second opening 30 is positioned directly opposite opening 28 and permits passage of the electrode sections to nozzle assembly 4.

A mounting block 32 is positioned directly in the path between openings 28, 30 and is rigidly attached on one side to a shaft 34 which is journalled in cover plate 26. A drive shaft 36 extends from gear box 14 into recess 24 and is journalled in body 22 at 37 and in mounting block 32 at 38, extending therethrough and terminating in a bearing sleeve 40.

Mounting block 32, as shown in FIGURE 8 has a hollow rectangular body 42 with a pair of flanges 44, 45 extending outwardly from back wall 46 and forwardly a distance from side walls 48, 49. The space between flanges 44, 45 and their corresponding side walls 48, 49 is provided for receiving the gears which operate feed rollers 50, 51 mounted in rectangular opening 52 of body 42. With reference to FIGS. 6 and 8 a first driving gear 54 is fixedly mounted on drive shaft 36 and is received in recess 56 formed in left hand flange 44. First driving gear 54 is used to operate the conveyer for removing electrode sections from the storage hopper and its operation will be more fully described subsequently. A second, smaller driving gear 58 is fixedly attached to drive shaft 36 and is positioned between first gear 54 and left side wall 48 of body 42. A third gear 60 is positioned beneath and driven by gear 58 to rotate a shaft 62 which is rotatably suported in mounting block 32 by bearing sleeves 64, 66 in openings 68, 70. Shaft 62 fixedly mounts a lower feeding roller 50 in opening 52 and a fourth driving gear 72 between right flange 45 and right side wall 49. Gear 72 is positioned beneath and drives fifth gear 74 which is fixedly attached to a shaft 76 extending through sleeves 78, 79 in openings 80, 81, to support upper feeding roller 51 which is radially spaced from lower roller 50, a sufficient distance to permit passage of the electrode sections.

When assembled, mounting block 32 is urged in a counterclockwise direction (as viewed in FIG. 2), about an axis extending perpendicular to the path of movement of the electrode and lying in the plane of and between the parallel axes of rotation of feed rollers 50, 51, by a spring assembly 82 associated with shaft 34. A spiral spring 84 (FIG. 7) is attached at its outer end to cover plate 26 by a pin 86 (FIG. 6) and at its inner end to a spring cover 88 which is rigidly attached to shaft 34. Spring 84 is maintained in a state of compression so that in attempting to expand it will tend to rotate mounting block 32 counterclockwise to urge upper feed roller 51 downwardly onto the electrode section, and lower feed roller upwardly against it (FIG. 2). In this manner, a firm engagement with the electrode section is maintained when the sectional dimension of the electrode section varies.

To permit initial insertion of an electrode section between rollers 50, 51 a handle 90 is provided to rotate shaft 34 in a clockwise direction and block 32 to a vertical position. Feed rollers 50, 51 are formed with inwardly tapering surfaces which are knurled to facilitate firm gripping engagement with the electrode sections.

Storage hopper 8 is attached to the rear of housing 15 and includes a base 92 which is recessed to define a conveyer trough 94. A conveyer belt 96 extends along trough 94 through passage 28 into recess 24 where it is mounted on a bracket and pulley assembly 98. Assembly 98 consists of a bracket 100 pivotally attached to bearing sleeves 40 at one end, and rotatably supporting a shaft 102, pulley 104 and gear 106 at its other end. Pulley 104 and gear 106 are fixedly mounted on shaft 102 and are rotated by first gear 54, previously described, to drive belt 96. A take up pulley assembly 108 is mounted at the opposite end of base 92 on a member 110 having a bracket 112. Belt 96 is strung on a pulley 114 which is rotatably attached to a pair of arms 116. The opposite ends of arms 116 are pivotally attached to bracket 112 and are urged rearwardly by spring 118 to maintain tension of belt 96. The upper section of belt 96 is supported along its length by a pair of bolts 120 which extend transversely across trough 94.

The storage area for the electrode sections is formed by a pair of side walls 122 extending upwardly from base 92, together with a front wall 124 attached to the rear of housing 15 between projections 126, and a rear wall 128. The lower end of front wall 124 is spaced from belt 96 a sufficient distance to permit passage of the electrode sections. A follower assembly 130 is attached to the upper end of front wall 124 to force the stacked electrode sections downwardly onto conveyer belt 96 and consists of a mounting bracket 131, a follower arm 132 having a lower base portion 134, and a helical spring 136 surrounding follower arm 132 and compressed between base portion 134 and bracket 130.

Nozzle assembly 4 is a conventiontal electric torch assembly with one signficant exception which permits greater flexibility of use. With reference to FIGS. 1, 2 and 5, it can be seen that the front end of housing 15 is formed with a threaded nipple 138 which surrounds opening 28. Nozzle assembly 4 includes tube 140 which provides a passage for the electrode section, and a surrounding sleeve 142 which includes a connector 144 which receives a power cable having a fluid cooling jacket (not shown), a connector 146 which provides a return for the cooling fluid, and a connector 148 which receives an air line for projecting a flow of air around the arc at the nozzle tip. The use of a cooling fluid to increase the current carrying capacity of the power line, for instance as described in copending application 287,437 filed June 12, 1963, now Patent No. 3,234,317, and assigned to the assignee of the present invention, as well as the use of a surrounding flow of air to confine the arc is well known in the art, and the specific nozzle structure for accomplishing this is not illustrated. However, where such means have been employed in the past, no provision has been made for relative movement between the supply lines and the torch assembly. In applicant's structure, on the other hand, sleeve 142 is rotatably secured to nipple 138 by a locking nut 150 having an inwardly turned flange 152 which engages a flange 154, made of a lubricating material such as silicon, which is attached to sleeve 142 and abuts nipple 138 to provide a bearing surface for rotation of sleeve 142 relative to housing 15.

OPERATION

The electrode sections to be used with the torch assembly are of the type described in U.S. application 153,135 filed Nov. 17, 1961, now Patent No. 3,131,290, and assigned to the assignee of the present invention, in which each section is formed with a reduced diameter projection at one end, and a complementary socket or recess at its opposite end. A continuous electrode is formed by firmly inserting the projection of one section into the socket of the preceding section to form a smooth joint. Reference is made to the aforementioned application for specific structural details, but for the purpose of illustration the phantom representation of the electrode sections in FIG. 2 will suffice.

As can be seen in FIG. 2, the sections are loaded into hopper 8 through its open top, follower assembly 130 being retracted to permit entrance. A vertical stack of sections is formed with the lowermost section 156 resting on conveyor belt 96, and the top electrode 158 being engaged by base 134 of follower 132 and urged downwardly by spring 136. When power is supplied to feeding mechanism 6 via drive shaft 12 and gear box 14, shaft 36 will be rotated to operate gears 54 and 58. Gear 54 engages gear 106 to rotate pulley 104 and operate conveyer belt 96 to remove bottom electrode section from hopper 8 and convey it towards feed rollers 50, 51. At the same time, gear 58 mounted on shaft 36 operates, because of its smaller diameter, to rotate feed rollers 50, 51 at a slower rate of speed via gears 60, 72 and 74. As the conveyed electrode section 156 approaches feed rollers 50, 51 handle 90 is released and spring assembly operates to force rollers 50, 51 into firm driving engagement with the lower and upper side of the electrode section, respectively. Further operation of the torch causes the electrode section to be fed into tube 140 and thus to the nozzle opening where it is consumed at a rate controlled by the current intensity and the speed of feed rollers 50, 51.

While a portion of section 156 remains within the confines of hopper 8, the sections above it will remain stationary. However, when the end of section 156 passes beneath front wall 124, the next section 160 will be forced downwardly onto belt 96 by the action of follower 132. As soon as section 160 is engaged by belt 96 it will be conveyed towards rollers 50, 51 as previously described, but since conveyer 96 operates at a higher rate of liner speed than rollers 50, 51 because of the size difference between gears 54 and 58, the differences in speed interact to cause the front socket end of section 160 to form a firm joint and a continuous electrode. Once the joint is formed belt 96 slips under section 160 and its rate of feed is controlled by rollers 50, 51.

This operation continues until the torch is shut down or hopper 8 is emptied. Hopper 8 may be reloaded while the torch is operated by raising follower arm 132 and inserting additional sections and the operation will continue without interruption.

From this description it can be appreciated that applicant has provided a torch assembly which is extremely flexible in utilization. Moreover, the unique electrode supplying feature provides a torch assembly which is relatively compact in size, which is capable of continuous operation over an extended period of time, and which supplies the electrode to the torch at a controllable rate.

It should also be appreciated that the assembly has applications with other types of electric arc torches as well as in other areas where it is desirable to feed an article at a controlled rate over an extended period of time.

While a certain preferred embodiment of the invention has been shown and described, it is to be understood that the invention is not solely restricted thereto, but that it is intended to cover all modifications which would be apparent to one skilled in the art, and which come within the spirit and scope of the invention.

What is claimed is:

1. An electric arc torch comprising a housing; nozzle means attached to one side of said housing; a hopper attached to the opposite side of said housing for storing a plurality of electrode sections; a conveyer extending along the bottom length of said hopper and into said housing for conveying electrode sections from said hopper into said housing; means resiliently urging electrode sections stored in said hopper into frictional engagement with said conveyer means in said housing for feeding electrode sections from said conveyer to said nozzle, said feeding means comprising a block mounted in said housing for rotation about an axis extending perpendicular to the path of movement of the electrode sections between said conveyer and said nozzle; a pair of spaced feeding wheels rotatably mounted on said block, the axes of rotation of said wheels extending parallel to, and lying on either side of said axis of rotation of said block; means for rotating said block to move said wheels into engagement with an electrode section placed between said wheels, and means commonly rotating said wheels to feed electrode sections to said nozzle means at a first linear rate and driving said conveyer to convey electrode sections to said wheels at a second linear rate greater than said first linear rate.

2. An electric arc torch comprising a housing, nozzle means attached to one side of said housing, a hopper attached to the opposite side of said housing for storing a plurality of electrode sections, a conveyer extending along the bottom length of said hopper and into said housing for conveying electrode sections from said hopper into said housing, means in said housing for feeding electrode sections from said conveyer to said nozzle, said feeding means comprising a block mounted in said housing for rotation about an axis extending perpendicular to the path of movement of the electrode sections between said conveyer and said nozzle, a pair of spaced feeding wheels rotatably mounted on said block, the axes of rotation of said wheels extending parallel to, and lying on either side of said axis of rotation of said block, means for rotating said block to move said wheels into engagement, with an electrode section placed between said wheels, means attaching said conveyer means to said block, and drive means commonly rotating said wheels to feed electrode sections to said nozzle means and driving said conveyer to convey electrode sections to said wheels, said drive means including a gear train mounted on said block for rotating said wheels at a first linear speed and for driving said conveyer at a second higher rate of speed.

3. An electric arc torch according to claim 2 wherein said means for rotating said block includes spring means normally urging said block in a first direction; and further comprising means for rotating said block in an opposite direction to permit the insertion of an electrode section between said wheels.

4. An electric arc torch according to claim 2 wherein said nozzle means includes a sleeve having connectors mounted thereon and said sleeve is mounted for rotational movement relative to said housing.

5. In an electric arc torch including a torch nozzle and a hopper for storing a plurality of elongated stacked electrode sections of the type having a male plug formed on one end thereof and a female socket on the other end thereof, the improvement comprising driven belt conveyer means extending into said hopper and along the bottom thereof for removing electrode sections therefrom one at a time, means for feeding the removed electrode sections to said nozzle, said feeding means including a pair of radially spaced feeding wheels, each said wheel being mounted for rotation about its individual axis and for rotation about a common axis positioned between and extending parallel to said individual axis, means for rotating said wheels about said common axis to engage an electrode section placed therebetween, means for rotating said wheels about said individual axis to advance an electrode section positioned therebetween at a first rate to said torch nozzle, and means resiliently urging said electrode sections toward the bottom of said hopper into frictional engagement with said driven belt for movement thereby between said hopper and said pair of feeding wheels, and means driving said conveyer belt to convey said electrode sections at a second rate faster than said first rate to force the socket of one electrode into firm mechanical engagement with the plug of a proceeding electrode to form a continuous length of electrode material at said nozzle.

6. An electric torch according to claim 5 wherein said means for rotating said wheels about said common axis includes spring means normally urging said wheels in a first direction; and further comprising means for rotating said wheels about said common axis in an opposite direction to permit the insertion of an electrode section between said wheels.

References Cited by the Examiner

UNITED STATES PATENTS

| | | | |
|---|---|---|---|
| 1,052,425 | 2/1913 | Ridings | 314—5 X |
| 1,932,263 | 10/1933 | Chapman | 314—5 |
| 2,190,150 | 2/1940 | Fay | 219—130 |
| 2,320,481 | 6/1943 | Steadwell | 314—68 |
| 2,395,723 | 2/1946 | Chmielewski | 314—5 X |
| 2,786,958 | 3/1957 | Frey | 314—5 X |
| 3,125,670 | 3/1964 | Hawthorne | 219—125 |
| 3,131,290 | 4/1964 | Stepath | 219—130 |
| 3,134,894 | 5/1964 | Farnsworth | 219—125 |

JOSEPH V. TRUHE, *Primary Examiner.*